(12) United States Patent
Yamaai

(10) Patent No.: US 6,785,420 B2
(45) Date of Patent: Aug. 31, 2004

(54) METHOD AND APPARATUS FOR TABLE RECOGNITION, APPARATUS FOR CHARACTER RECOGNITION, AND COMPUTER PRODUCT

(75) Inventor: Toshifumi Yamaai, Ohta-ku (JP)

(73) Assignee: Ricoh Company, Ltd., Tokyo (JP)

( * ) Notice: Subject to any disclaimer, the term of this patent is extended or adjusted under 35 U.S.C. 154(b) by 652 days.

(21) Appl. No.: 09/804,241

(22) Filed: Mar. 13, 2001

(65) Prior Publication Data

US 2001/0024520 A1 Sep. 27, 2001

(30) Foreign Application Priority Data

Mar. 15, 2000 (JP) ........................................ 2000-071399

(51) Int. Cl.$^7$ ................................................ G06K 9/48
(52) U.S. Cl. ...................... 382/199; 382/171; 382/175; 382/202; 382/203; 382/275; 715/510; 715/520; 715/521
(58) Field of Search ................................ 382/171–178, 382/187–190, 199, 202, 203, 275; 715/509–510, 520–521

(56) References Cited

U.S. PATENT DOCUMENTS

| | | | | |
|---|---|---|---|---|
| 5,119,437 A | * | 6/1992 | Kuwamura et al. | 382/175 |
| 5,991,440 A | * | 11/1999 | Matsubayashi et al. | 382/187 |
| 6,226,402 B1 | * | 5/2001 | Katsuyama | 382/171 |
| 6,327,387 B1 | * | 12/2001 | Naoi et al. | 382/190 |
| 6,434,270 B1 | * | 8/2002 | Ohara et al. | 382/178 |
| 6,636,631 B2 | * | 10/2003 | Miyazaki et al. | 382/187 |

FOREIGN PATENT DOCUMENTS

JP        10-049676        2/1998

* cited by examiner

Primary Examiner—Bhavesh M. Mehta
Assistant Examiner—Gregory Desire
(74) Attorney, Agent, or Firm—Oblon, Spivak, McClelland, Maier & Neustadt, P.C.

(57) ABSTRACT

The character recognition apparatus incorporates a table recognition section. This table recognition section extracts circumscribing rectangles from connected components of black pixels on a whole surface of the image as an area where read image data are desired to be processed, sorts rectangles of character candidates and rectangles of frame candidates from the extracted circumscribing rectangles, fills the rectangles sorted as the character candidates with white pixels, recognizes and extracts frames as ruled lines from the rectangles which remain as the frame candidates.

12 Claims, 7 Drawing Sheets

FIG.3

APPLICATION FORM — RECEIPT SEAL

| DATE OF APPLICATION | YEAR | MONTH | DAY |

FRAME FOR DEALER

APPLICANT — ADDRESS / NAME

CONTENTS

FIG.4

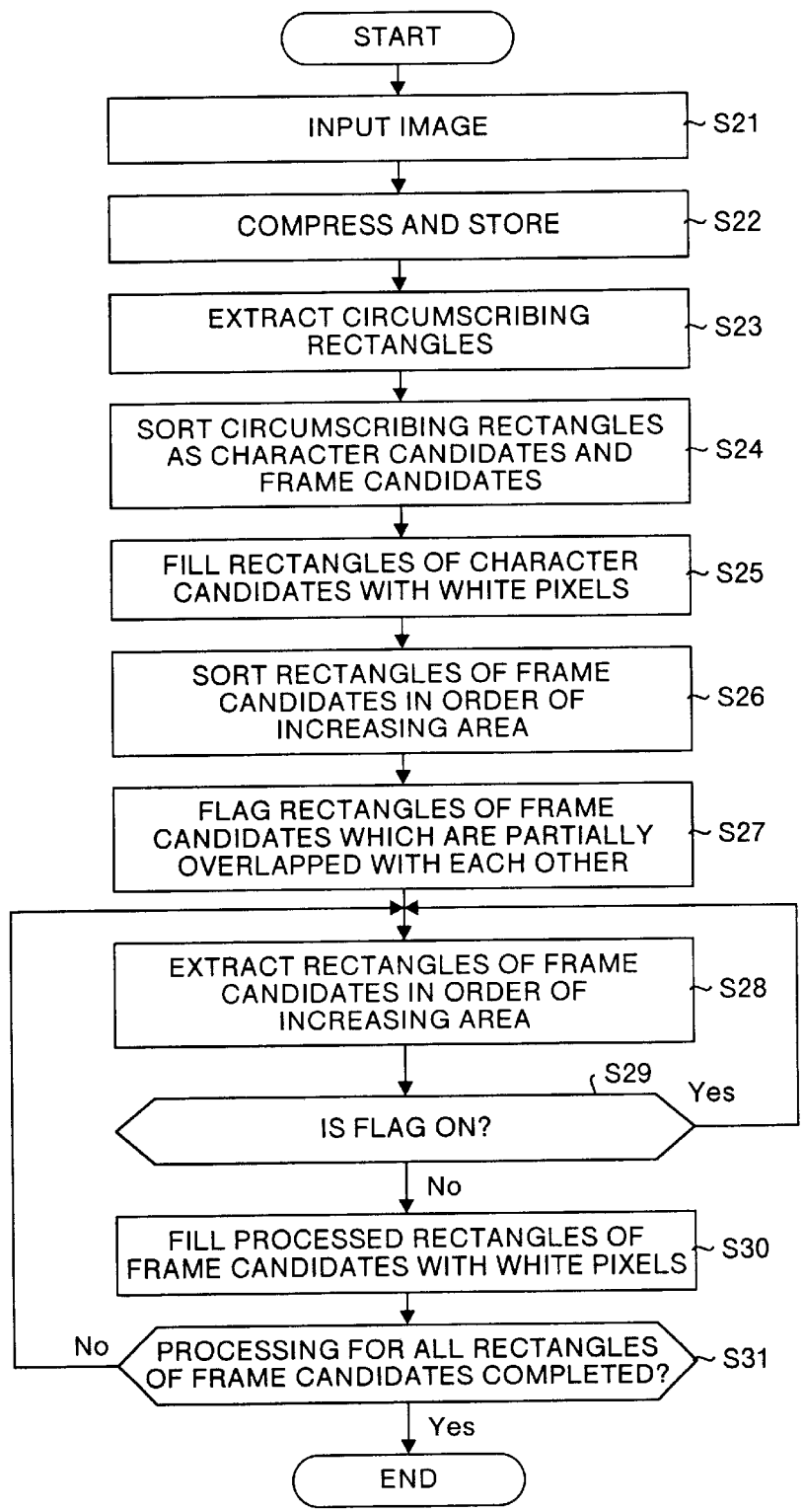

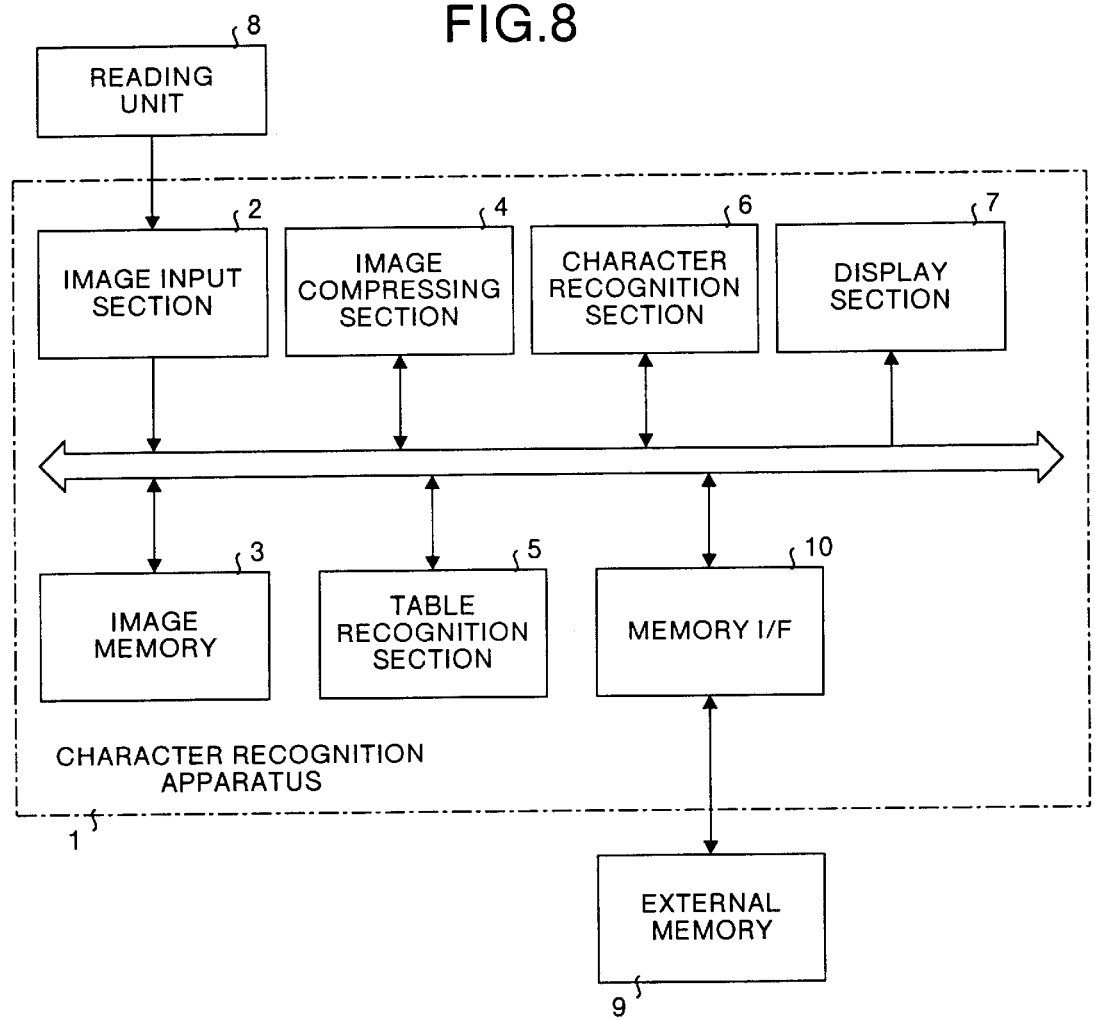

METHOD AND APPARATUS FOR TABLE RECOGNITION, APPARATUS FOR CHARACTER RECOGNITION, AND COMPUTER PRODUCT

FIELD OF THE INVENTION

The invention in general relates to a technology capable of recognizing hand-written or printed ruled lines in a document such as an application form.

BACKGROUND OF THE INVENTION

It is a common practice to process hand-written or printed forms (for example, application forms or mark-sheets) using a character recognition apparatus. Such a form may contain tables drawn with rule lines which may again be hand-written or printed. However, if the lines are faint, then it becomes difficult for the character recognition apparatus to decide whether it is a line or a character.

A technology for overcoming this drawback is disclosed in Japanese Patent Application Laid-Open No. 10-49676. What is disclosed is as follows. A histogram of a black run is calculated from a document image, and a threshold value of the black run as a parameter for extracting a ruled line is extracted based on the calculated histogram. Further, rectangles which are connected components of the black run not less than the extracted threshold value are extracted, and the proximity rectangles are combined so that continuous ruled lines are extracted. Then, a histogram of a length of the ruled line of the document image is calculated, and a threshold value for extracting the length of the ruled lines is extracted based on the calculated histogram. Thereafter, a continuous ruled line having a length not less than the threshold value for extracting the length of the extracted ruled line is recognized as a ruled line.

However, if black pixels which are continued are not more than threshold values, a special process for connecting ruled lines is required. In this special process, for example, candidate areas in which ruled lines are considered to exist are sorted out, and a judgment is made as to whether the candidate areas are really ruled lines. However, in this case, there occur errors such that a large-character portion which is written as a title, for example, is extracted as a ruled line, or a lot of character rectangles having accidentally long run exist in the positions of the ruled line candidates, the judgment is made that the ruled lines exist. Moreover, when a plurality of frames exist inside a frame, a position to be the ruled line candidate becomes enormous. For this reason, this case has disadvantages that the extraction fails and overflow occurs.

SUMMARY OF THE INVENTION

It is an object of the present invention to provide a method and apparatus for table recognition, an apparatus for character recognition, and a computer readable recording medium that stores a computer program which when executed realizes the method according to the present invention.

According to one aspect of this invention, there are provided a method and apparatus for table recognition having a configuration as follows. First, circumscribing rectangles of connected components of black pixels of the document image are extracted. Then, the extracted circumscribing rectangles are separated into character candidates and frame candidates according to information such as an aspect ratio, a number of black pixels and a number of black runs of the extracted circumscribing rectangles. Then, images within a range of the rectangles which have been separated as the character candidates are filled with white. Finally, frames are recognized from the rectangles which have been separated as the frame candidates.

According to another aspect of this invention, there are provided a method and apparatus for table recognition having a configuration as follows. First, circumscribing rectangles of connected components of black pixels of the document image are extracted. Then, the extracted circumscribing rectangles are separated into character candidates and frame candidates according to information such as an aspect ratio, a number of black pixels and a number of black runs of the extracted circumscribing rectangles. Then, images within a range of the rectangles which have been separated as character candidates are filled with white. The rectangles which have been separated as the frame candidates are rearranged in order of increasing area. Frames are successively extracted from the rectangles which have been separated as the frame candidates in the order of increasing area. Finally, the images of the rectangles which have been separated as the frame candidates from which the frames were extracted are repeatedly filled with white.

According to still another aspect of this invention, there are provided a method and apparatus for table recognition having a configuration as follows. First, circumscribing rectangles of connected components of black pixels of the document image are extracted. Then, the extracted circumscribing rectangles are separated into character candidates and frame candidates according to information such as an aspect ratio, a number of black pixels and a number of black runs of the extracted circumscribing rectangles. Then, images within a range of the rectangles which have been separated as character candidates are filled with white. The rectangles which have been separated as the frame candidates are rearranged in order of increasing area. Frames are successively extracted from the rectangles which have been separated as the frame candidates in the order of increasing area. When a number of the rectangles have been separated as the frame candidates is not more than two and they do not establish a positional relationship that they are partially overlapped with each other, then the images of the rectangles which have been separated as the frame candidates from which the frames were extracted are filled with white. On the other hand, when a number of the rectangles have been separated as the frame candidates is not more than two but they establish a positional relationship that they are partially overlapped with each other, then the image of the rectangles which have been separated as the frame candidates from which the frames were extracted are not filled with white, and a frame from the rectangle of next candidate is extracted.

The character recognition apparatus according to still another aspect of this invention incorporates the table recognition apparatus according to this invention.

The computer readable recording medium according to still another aspect of this invention stores a computer program which when executed realizes the method according to the present invention.

Other objects and features of this invention will become apparent from the following description with reference to the accompanying drawings.

BRIEF DESCRIPTION OF THE DRAWINGS

FIG. 3 is a display diagram showing an example of an input document image;

FIG. 4 is a display diagram showing a rectangle sorted as frame candidate;

FIG. 7 is a flowchart of a character recognition method according to a third embodiment; and FIG. 8 is a block diagram showing a structure of a character recognition apparatus according to a fourth embodiment.

DESCRIPTION OF THE PREFERRED EMBODIMENTS

The character recognition apparatus of the present invention has an image input section, an image memory, an image compressing section, a table recognition section, a character recognition section and a display section. The table recognition section executes a pre-process when a character is recognized from image data input by the character recognition section, and it has a circumscribing rectangle extracting section, a rectangle sorting section, a frame candidate extracting section and a ruled line extracting section.

When a document image is read by a reading unit and is input into the image input section of the character recognition apparatus, the image compressing section compresses the input image data and stores the compressed data in the image memory. The table recognition section reads the image data stored in the image memory. The circumscribing rectangle extracting section extracts circumscribing rectangles from connected components of black pixels on a whole surface of an image as an area where the read image data are desired to be processed. The rectangle sorting section sorts out rectangles of character candidates and rectangles of frame candidates from the extracted circumscribing rectangles. When this sorting is carried out, the rectangle sorting section sorts circumscribing rectangles with a large aspect ratio as frame candidates and circumscribing rectangles whose internal black pixel percentage is high as character candidates. Namely, since a maximum value of a histogram of a length of an inside black run is taken and this value corresponds to a thickness of a ruled line, when a number of actual black pixels is smaller than a number of black pixels when assuming that the ruled line with this thickness is outside the rectangle, the circumscribing rectangle is a character candidate. As for rectangles which were sorted as character candidates, the frame candidate extracting section fills insides of coordinate values of those rectangles with white pixels. The ruled line extracting section recognizes a frame which is a ruled line from rectangles which remain as frame candidates so as to extract it.

Figure 1:
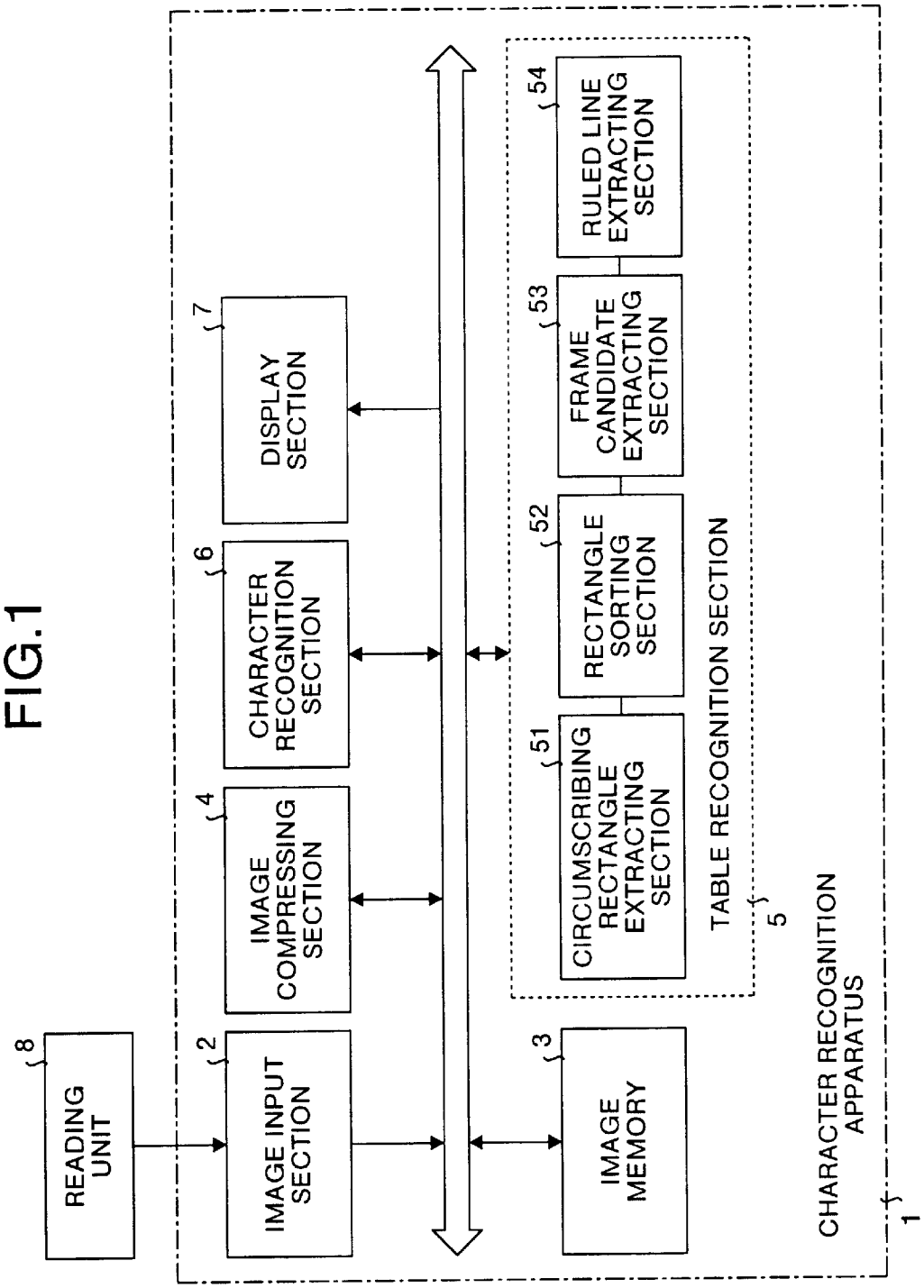
FIG. 1 is a block diagram showing a structure of a character recognition apparatus according to a first embodiment of the present invention.

FIG. 1 is a block diagram showing a structure of a character recognition apparatus according to a first embodiment of the present invention. The character recognition apparatus 1 has an image input section 2, an image memory 3, an image compressing section 4, a table recognition section 5, a character recognition section 6 and a display section 7. The image input section 2 receives an image read by a reading unit 8 such as a scanner, a digital camera. The image memory 3 stores input image data and image data which were subject to various processes. The image compressing section 4 compresses the image data input from the image input section 2 and stores the compressed image data in the image memory 3. The table recognition section 5 executes a pre-process when characters are recognized from the image data input in the character recognition section 6. The table recognition section 5 comprises a circumscribing rectangle extracting section 51, a rectangle sorting section 52, a frame candidate extracting section 53 and a ruled line extracting section 54. The circumscribing rectangle extracting section 51 extracts circumscribing rectangles from connected components of black pixels in an area where the input image data are desired to be processed. The rectangle sorting section 52 sorts rectangles of character candidates or rectangles of frame candidates from the extracted circumscribing rectangles. The frame candidate extracting section 53 fills positions of the rectangles sorted as character candidates with white on an original image, and extracts frame of the rectangles which remain as frame candidates. The ruled line extracting section 54 extracts ruled lines from the extracted frames.

Figure 2:
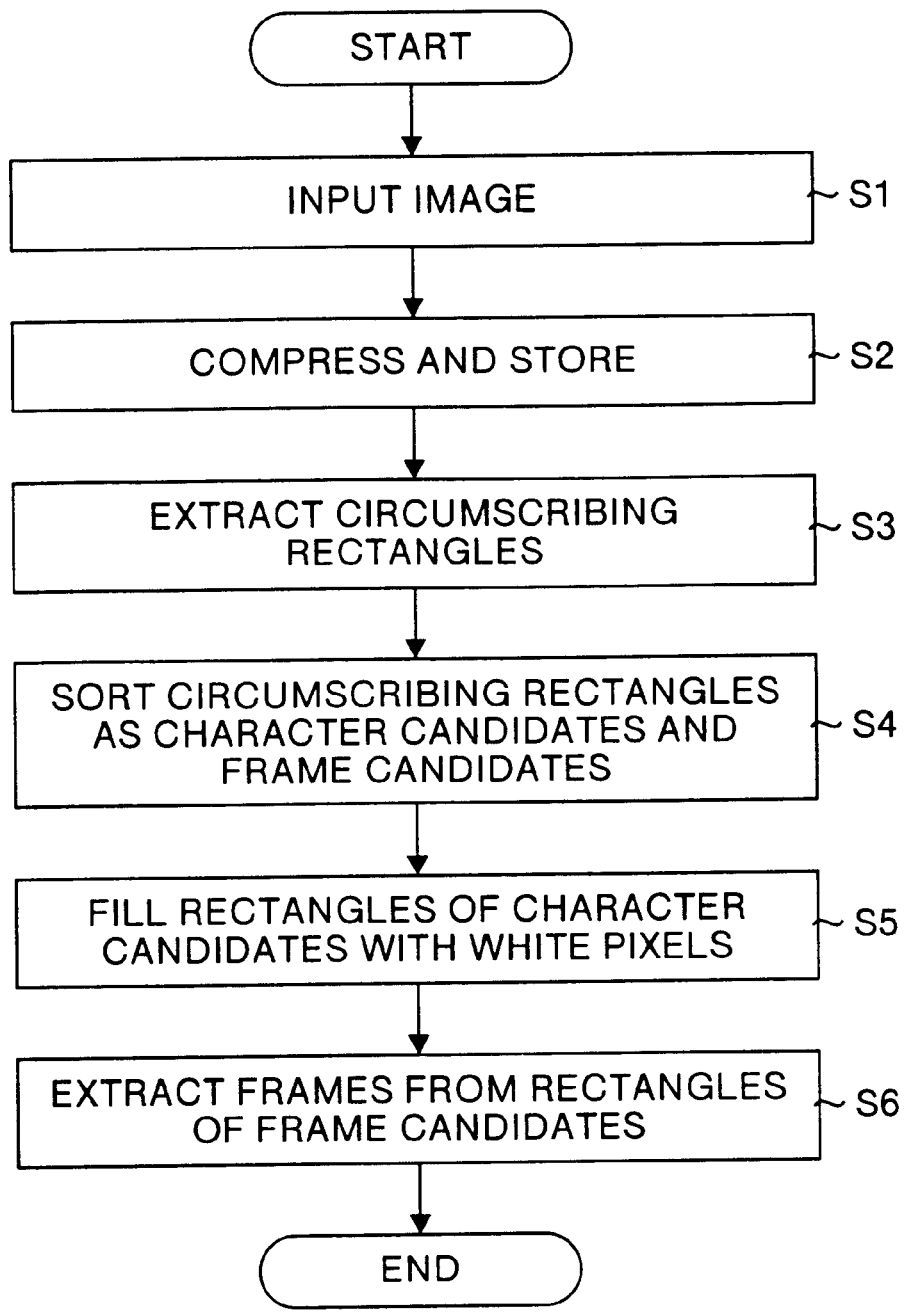
FIG. 2 is a flowchart of a character recognition method according to a first embodiment.

There will be explained below an operation for extracting a frame from the image data input in the character recognition apparatus 1 having the above structure and extracting a ruled line by means of the table recognition section 5 with reference to the flowchart of FIG. 2.

When the reading unit 8 reads a document image 11 shown in FIG. 3, for example, and inputs the image 11 into the image input section 2 of the character recognition apparatus 1 (step S1), the image compressing section 4 compresses the input image data in order to reduce use memory and processing time and stores them in the image memory 3 (step S2). When the image compressing section 4 compresses the image data according to an OR method, for example, a ruled line is further blurred. The table recognition section 5 reads the image data stored in the image memory 3. The circumscribing rectangle extracting section 51 extracts circumscribing rectangles from connected components of the black pixels on a whole surface of the image 11 where the read image data are desired to be processed (step S3). The rectangle sorting section 52 sorts rectangles of character candidates or rectangles of frame candidates from the extracted circumscribing rectangles. In the rectangle sorting method, the rectangle sorting section 52 sorts the circumscribing rectangles with a large aspect ratio as frame candidates, and the circumscribing rectangles whose inside black pixel percentage is high as character candidates. Since a maximum value of a histogram of a length of the internal black runs is taken and this value corresponds to a thickness of the ruled line, when a number of actual black pixels is smaller than a number of black pixels assuming that the ruled line of that thickness is outside the rectangle, the circumscribing rectangle is a character candidate. In such a manner, rectangles of character candidates or rectangles of frame candidates are sorted from the rectangles. Since a small and slender rectangle, for example, is possibly generated due to blur of a ruled line, such a rectangle is sorted as a non-character candidate (step S4). As a result of the sorting, as shown in FIG. 4, as for the rectangles sorted as the character candidates, the frame candidate extracting section 53 fills insides of coordinate value of those rectangles with white pixels (step S5). When the insides of the coordinate value of the rectangles sorted as the character candidates are filled with white pixels in such a manner, this means that pixels do not exist in the positions of an image 12. As a result, long run on characters or the like can be prevented from exercising a bad influence on frame extraction. Next, the ruled line extracting section 54 recognizes and extracts frames which are ruled lines from rectangles A to D which remain as frame candidates (step S6).

Since the circumscribing rectangles are sorted as rectangles of character candidates or rectangles of frame candidates in such a manner and the insides of the coordinate value of the rectangles sorted as character candidates are filled with white pixels, a ruled line which is not necessary in a character position can be prevented from being extracted.

Figure 5:
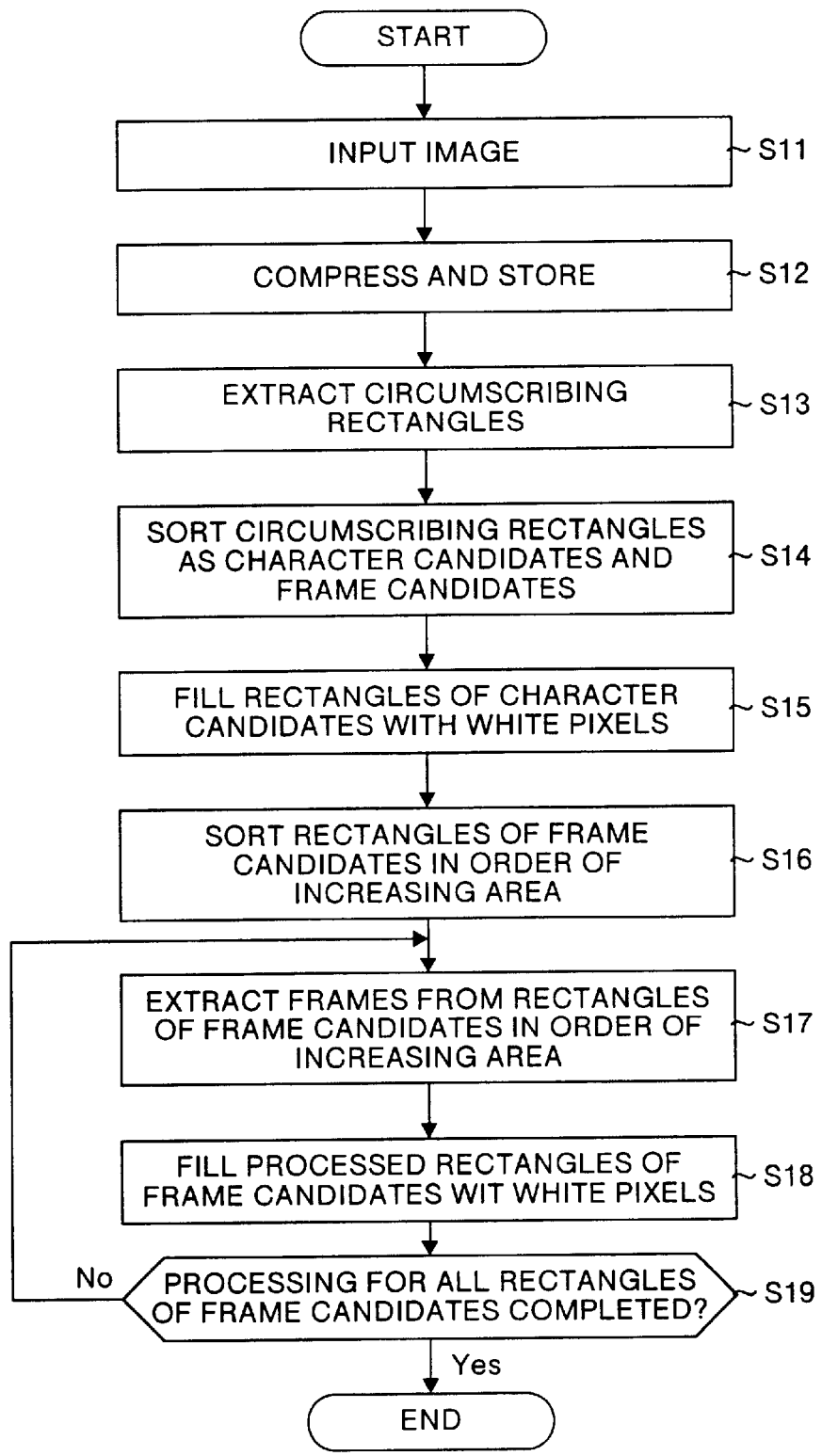
FIG. 5 is a flowchart of a character recognition method according to a second embodiment.
Figure 6A:
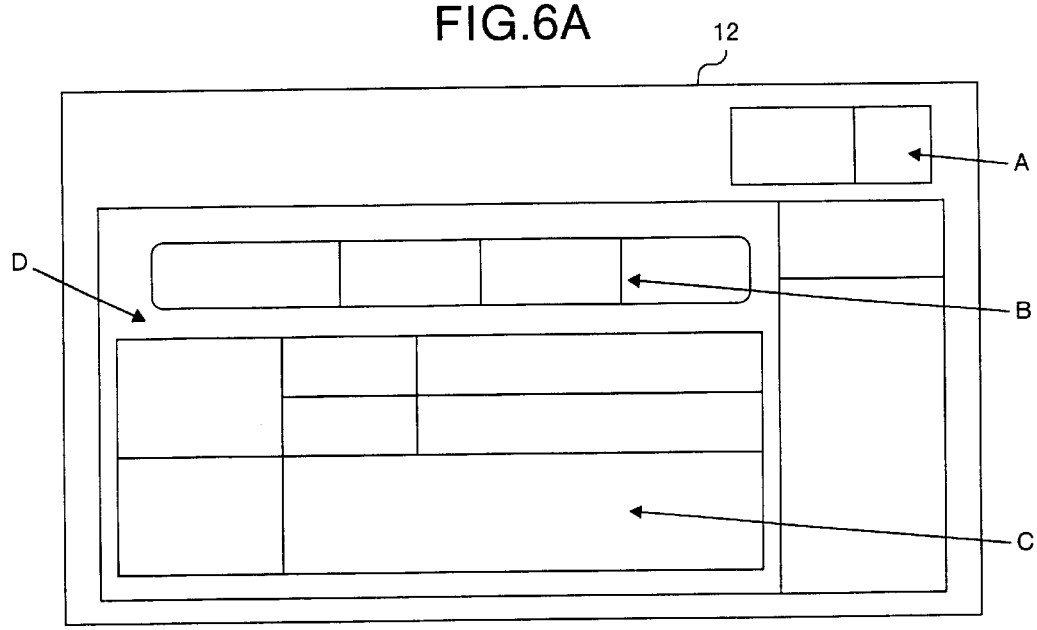
FIG. 6A and FIG. 6B are diagrams for explaining the character recognition method according to a second embodiment.
Figure 6B:
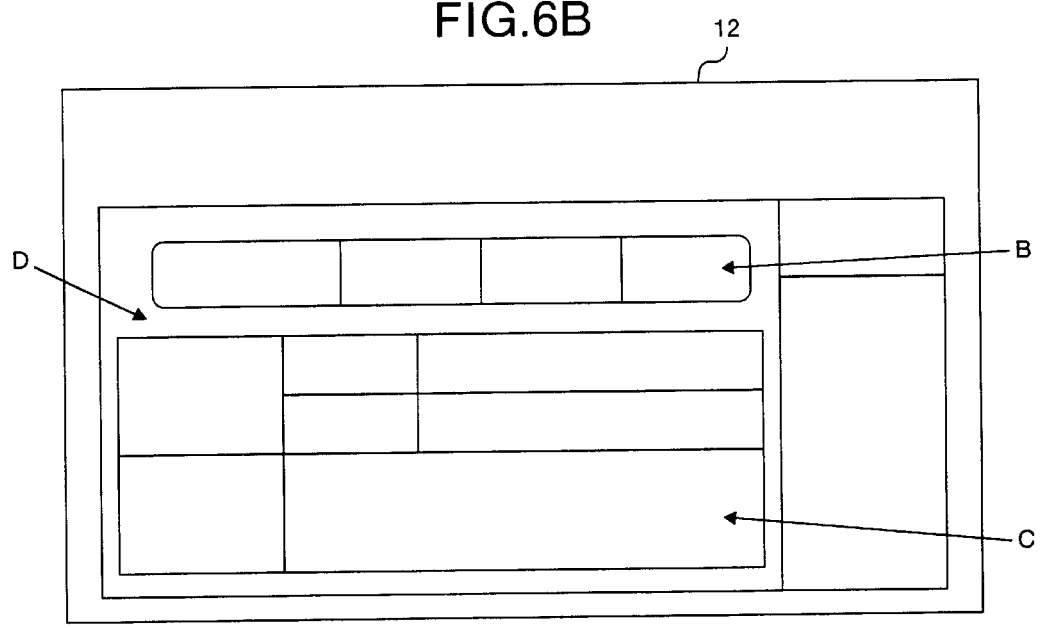

Next, there will be explained below a process of a second embodiment with reference to the flow chart of FIG. 5. When the reading unit 8 reads the document image 11 shown in FIG. 3 and inputs the image 11 into the image input section 2 of the character recognition apparatus 1 (step S11), the image compressing section 4 compresses the input image data in order to reduce the use memory and the processing time, and stores them in the image memory 3 (step S12). When the image compressing section 4 compresses the image data according to the OR method, for example, the ruled line is further blurred. The table recognition section 5 reads the image data stored in the image memory 3. The circumscribing rectangle extracting section 51 extracts circumscribing rectangles from connected components of reading black pixels on a whole surface of the image 11 as an area where the read image data are desired to be processed (step S13). The rectangle sorting section 52 sorts rectangles of character candidates or rectangles of frame candidates from the extracted circumscribing rectangles. In the method of sorting the rectangles by means of the rectangle sorting section 52, for example, the rectangles having a large aspect ratio are frame candidates, and the rectangles whose inner black pixel percentage is high are character candidates. Since the maximum value of a histogram of a length of the inner black run is taken and the this value corresponds to a thickness of a ruled line, when a number of actual black pixels is smaller than a number of black pixels assuming that the ruled line of this thickness is outside the rectangle, the rectangle is a character candidate. In such a manner, rectangles of character candidates or rectangles of frame candidates are sorted from the rectangles. Since a small and slender rectangle or the like is possibly generated due to blur of a ruled line, such a rectangle is sorted as non-character candidate (step S14). As a result of this sorting, as shown in FIG. 6A, the frame candidate extracting section 53 fills insides of coordinate value of the rectangles on the image 12 sorted as character candidates with white pixels (step S15). When the insides of the coordinate value of the rectangles sorted as character candidates are filled with white pixels in such a manner, this means that pixels do not exist in those positions, and a long run or the like on a character can be prevented from exercising a bad influence on extraction of frame. Next, the ruled line extracting section 54 sorts rectangle A, rectangle B, rectangle C, rectangle D and the like in ascending order of area from all the rectangles which remain as frame candidates (step S16). Thereafter, a frame as a ruled line is extracted from the rectangle A of the frame candidate with small area (step S17). After the extraction of the frame from the rectangle A of one frame candidate is completed, as shown in FIG. 6B, the position of the rectangle A of the frame candidate is filled with white pixels (step S18). When the position of the rectangle A of the frame candidate is filled with white pixels in such a manner, this means that black pixels do not exist in the position of the rectangle A. As a result, when a frame is extracted from next candidate, the process can be executed in such a manner that black pixels are regarded as not existing in the positions of rectangles of frame candidates before the previous frame candidate. This process is repeated for all the rectangles B, C and D of the frame candidates (step S19).

Since the frame as a ruled line is extracted from the rectangle A of small area in such a manner, even if a frame exists in the frame, the ruled line can be extracted correctly.

Next, there will be explained below a process of a third embodiment with reference to the flow chart of FIG. 7. When the reading unit 8 reads the document image 11 shown in FIG. 3 and inputs it into the image input section 2 of the character recognition apparatus 1 (step S21), the image compressing section 4 compresses the input image data in order to reduce use memory and processing time and stores the compressed image data into the image memory 3 (step S22). When the image compressing section 4 compresses the image data according to the OR method, a ruled line is further blurred. The table recognition section 5 reads the image data stored in the image memory 3. The circumscribing rectangle extracting section 51 extracts circumscribing rectangles from connected components of reading black pixels on the whole surface of the image 11 as an area where the read image data are desired to be processed (step S23). The rectangle sorting section 52 sorts rectangles of character candidates rectangles of frame candidates from the extracted circumscribing rectangles. In the method of sorting the rectangles by means of the rectangle sorting section 52, for example, the circumscribing rectangles with a large aspect ratio are frame candidates, and the circumscribing rectangles whose inner black pixel percentage is high are character candidates. Since the maximum value of a histogram of the inner black runs is taken and the maximum value corresponds to a thickness of a ruled line, when a number of actual black pixels is smaller than a number of black pixels assuming the ruled line of that thickness to be outside the rectangle, the circumscribing rectangle is a character candidate. In such a manner, the circumscribing rectangles are sorted as rectangles of character candidates or rectangles of frame candidates. Since a small and slender rectangle or the like is possibly generated due to blur of a ruled line, such a rectangle is sorted as non-character candidate (step S24). As a result of this sorting, the frame candidate extracting section 53 fills insides of a coordinate value of the rectangles sorted as character candidates with white pixels (step S25) When the insides of the coordinate value of the rectangles sorted as character candidates are filled with white pixels in such a manner, this means that pixels do not exist in that position, black run on a character or the like can be prevented from exercising a bad influence on extraction of a frame. Next, the ruled line extracting section 54 sorts rectangles in order of increasing area from all the rectangles which remain as frame candidates (step S26). Positional relationships between the rectangles remaining as frame candidates are checked, and a pair of rectangles which do not establish a generic relationship but are partially overlapped with each other are sought out, and when the overlapped portion is found, it is flagged (step S27). A frame as a ruled line is extracted from the rectangle A with small area (step S28). After the extraction of a frame from the square of one frame candidate is completed, when a flag which represents that a rectangle having an overlapped portion exists in the circumscribing rectangle is shown, the process is ended so that a frame is extracted from a rectangle of next frame candidate (steps S29 and S28). Moreover, when the flag which shows that a rectangle having an overlapped portion exists in the circumscribing rectangle is not shown, the position of the rectangle of that frame candidate is filled with white pixels (step S30). This process is repeated for all the rectangles of frame candidates (step S31).

In the case of a rectangle without such an overlapped portion, the position of the rectangle of frame candidate is filled with white pixels so that a bad influence on post-processes can be prevented. Moreover, in the case of a rectangle with an overlapped portion, filling of the position of the rectangle of that frame candidate with white pixels is suppressed, and pixels on a portion originally necessary for a rectangle which is processed can be prevented previously from being deleted by white.

The above embodiments explained the case where the circumscribing rectangle extracting section 51, the rectangle sorting section 52, the frame extracting section 53 and the ruled line extracting section 54 of the table recognition section 5 sort rectangles according to character candidate and frame candidate, and a frame as a ruled line is extracted from the rectangle of frame candidate. However, as shown in the block diagram of FIG. 8, the above-mentioned processing programs are stored in an external memory 9 such as a hard disc, and the pre-processing section 5 reads the processing programs stored in the external memory 9 via a memory interface 10. Thereafter, rectangles are sorted according to character candidate and frame candidate by the read processing programs so that a frame as a ruled line may be extracted from a rectangle of frame candidate.

As explained above, according to the present invention, a table area of a document image is sorted according to a rectangle of character candidate and a rectangle of frame candidate, and an inside of a coordinate value of the rectangle sorted as character candidate is filled with white pixels so that a frame as a ruled line is extracted from the rectangle sorted as frame candidate. As a result, a ruled line which is not necessary in a position of character can be prevented from being extracted.

In addition, when frames as ruled lines are extracted from rectangles sorted as frame candidates, the frames as ruled lines are extracted from the rectangles of frame candidates successively in order of increasing area. As a result, even if a frame exists inside the frame, a ruled line can be extracted correctly. Further, even if more frames exists, frames as ruled lines are extracted from the rectangles of frame candidates in order of increasing area. As a result, a memory can be prevented from overflowing.

In addition, when frames as ruled lines are extracted from rectangles sorted as frame candidates, in the case of rectangles with overlapped portion, filling of positions of the rectangles of frame candidates with white pixels is suppressed so that pixels of a portion which are originally necessary for a rectangle processed can be prevented previously from being deleted by white.

When the table recognition apparatus which executes this table recognition is provided to the character recognition apparatus, a position of a table can be extracted before a character is recognized so that recognizing accuracy of a character can be heightened.

In addition, the table recognition programs which execute this table recognition are stored in a storage medium so that a position of a table can be easily extracted before characters are recognized.

The present document incorporates by reference the entire contents of Japanese priority document, 2000-071399 filed in Japan on Mar. 15, 2000.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A table recognition method for recognizing a frame as a ruled line in a table area of a document image including the table area, the table recognition method comprising:

extracting circumscribing rectangles of connected components of black pixels of the document image;

sorting the extracted circumscribing rectangles as character candidates and frame candidates according to information including at least one of an aspect ratio, a number of black pixels, and a number of black runs of the extracted circumscribing rectangles;

filling the image inside the entire area of the rectangles which have been sorted as the character candidates with white; and recognizing frames from the rectangles which have been sorted as the frame candidates.

2. A table recognition method for recognizing a frame as a ruled line in a table area of a document image including the table area, the table recognition method comprising:

extracting circumscribing rectangles of connected components of black pixels of the document image;

sorting the extracted circumscribing rectangles as character candidates and frame candidates according to information including at least one of an aspect ratio, a number of black pixels, and a number of black runs of the extracted circumscribing rectangles;

filling the image inside the entire area of the rectangles which have been sorted as the character candidates with white;

rearranging the rectangles sorted as the frame candidates in order of increasing area;

extracting frames successively from the rectangles sorted as the frame candidates in the order of increasing area; and repeatedly filling the images of the rectangles which have been sorted as the frame candidates from which the frames were extracted with white.

3. A table recognition method for recognizing a frame as a ruled line in a table area of a document image including the table area, the table recognition method comprising:

extracting circumscribing rectangles of connected components of black pixels of the document image;

sorting the extracted circumscribing rectangles as character candidates and frame candidates according to information including at least one of an aspect ratio, a number of black pixels, and a number of black runs of the extracted circumscribing rectangles;

filling the image inside the area of the rectangles which have been sorted as the character candidates with white;

rearranging the rectangles sorted as the frame candidates in order of increasing area;

extracting frames successively from the rectangles sorted as the frame candidates in the order of increasing area;

when a number of the rectangles sorted as frame candidates is not more than two and the frame candidates do not establish a positional relationship that the frame candidates are partially overlapped with each other, filling the image inside the area of the rectangles which have been sorted as the character candidates with white; and when the number of the rectangles sorted as frame candidates is not more than two and the frame candidates establish a positional relationship that the frame candidates are partially overlapped with each other, suppressing filling the image inside the area of the rectangles which have been sorted as the character candidates with white and extracting a frame from the rectangle of a next candidate.

4. A table recognition apparatus for recognizing a frame as a ruled line in a table area of a document image including the table area, the table recognition apparatus comprising:

a circumscribing rectangle extracting section configured to extract circumscribing rectangles of connected components of black pixels of the document image;

a rectangle sorting section configured to sort the extracted circumscribing rectangles as character candidates and frame candidates according to information, including at least one of an aspect ratio, a number of black pixels, and a number of black runs of the extracted circumscribing rectangles;

a frame candidate extracting section configured to fill the image inside the entire area of the rectangles which have been sorted as the character candidates with white; and a ruled line extracting section configured to recognize frames from the rectangles which have been sorted as the frame candidates.

5. A table recognition apparatus for recognizing a frame as a ruled line in a table area of a document image including the table area, the table recognition apparatus comprising:

a circumscribing rectangle extracting section configured to extract circumscribing rectangles of connected components of black pixels of the document image;

a rectangle sorting section configured to sort the extracted circumscribing rectangles as character candidates and frame candidates according to information including at least one of an aspect ratio, a number of black pixels, and a number of black runs of the extracted circumscribing rectangles;

a frame candidate extracting section configured to fill the image inside the entire area of the rectangles which have been sorted as the character candidates with white; and a ruled line extracting section configured to extract frames from the rectangles sorted as the frame candidates successively in order of increasing area and to repeatedly fill the images of the rectangles which have been sorted as the frame candidates from which the frames were extracted with white.

6. A table recognition apparatus for recognizing a frame as a ruled line in a table area of a document image including the table area, the table recognition apparatus comprising:

a circumscribing rectangle extracting section configured to extract circumscribing rectangles of connected components of black pixels of the document image;

a rectangle sorting section configured to sort the extracted circumscribing rectangles as character candidates and frame candidates according to information including at least one of an aspect ratio, a number of black pixels, and a number of black runs of the extracted circumscribing rectangles;

a frame candidate extracting section configured to fill the image inside the area of the rectangles which have been sorted as the character candidates with white; and a ruled line extracting section configured to rearrange the rectangles sorted as frame candidates in order of increasing area, to extract frames from the rectangles sorted as frame candidates successively in order of increasing area, when a number of the rectangles sorted as frame candidates is not more than two and the frame candidates do not establish a positional relationship that the frame candidates are partially overlapped with each other, to fill the image inside the area of the rectangles which have been sorted as the character candidates with white, and when the number of the rectangles sorted as frame candidates is not more than two and the frame candidates establish a positional relationship that the frame candidates are partially overlapped with each other, to suppress filling of the image inside the area of the rectangles which have been sorted as the character candidates with white and to extract a frame of the rectangle of a next frame candidate.

7. A character recognition apparatus comprising a table recognition apparatus for recognizing a frame as a ruled line in a table area of a document image including the table area, said table recognition apparatus comprising:

a circumscribing rectangle extracting section configured to extract circumscribing rectangles of connected components of black pixels of the document image;

a rectangle sorting section configured to sort the extracted circumscribing rectangles as character candidates and frame candidates according to information including at least one of an aspect ratio, a number of black pixels, and a number of black runs of the extracted circumscribing rectangles;

a frame candidate extracting section configured to fill the image inside the entire area of the rectangles which have been sorted as the character candidates with white; and a ruled line extracting section configured to recognize frames from the rectangles which have been sorted as the frame candidates.

8. A character recognition apparatus comprising a table recognition apparatus for recognizing a frame as a ruled line in a table area of a document image including the table area, said table recognition apparatus comprising:

a circumscribing rectangle extracting section configured to extract circumscribing rectangles of connected components of black pixels of the document image;

a rectangle sorting section configured to sort the extracted circumscribing rectangles as character candidates and frame candidates according to information including at least one of an aspect ratio, a number of black pixels, and a number of black runs of the extracted circumscribing rectangles;

a frame candidate extracting section configured to fill the image inside the entire area of the rectangles which have been sorted as the character candidates with white; and a ruled line extracting section configured to extract frames from the rectangles sorted as the frame candidates successively in order of increasing area and to repeatedly fill the images of the rectangles which have been sorted as the frame candidates from which the frames were extracted with white.

9. A character recognition apparatus comprising a table recognition apparatus for recognizing frame as a ruled line in a table area of a document image including the table area, said table recognition apparatus comprising:

a circumscribing rectangle extracting section configured to extract circumscribing rectangles of connected components of black pixels of the document image;

a rectangle sorting section configured to sort the extracted circumscribing rectangles as character candidates and frame candidates according to information including at least one of an aspect ratio, a number of black pixels, and a number of black runs of the extracted circumscribing rectangles;

a frame candidate extracting section configured to fill the image inside the area of the rectangles which have be sorted as the character candidates with white; and a ruled line extracting section configured to rearrange the rectangles sorted as frame candidates in order of increasing area, to extract frames from the rectangles sorted as frame candidates successively in order of increasing area, when a number of the rectangles sorted as frame candidates is not more than two and the frame candidates do not establish a positional relationship that the frame candidates are partially overlapped with each other, to fill the image inside the area of the rectangles which have been sorted as the character candidates with white, and when the number of the rectangles sorted as frame candidates is not more than two and the frame candidates establish a positional relationship that the frame candidates are partially overlapped with each other, to suppress filling of the image inside the area of the rectangles which have been sorted as the character candidates with white and to extract a frame of the rectangle of a next frame candidate.

10. A computer readable medium for storing instructions, which when executed on a computer, causes the computer to realize a table recognition method of recognizing a frame as a rule line in a table area of a document image including the table area, the table recognition method comprising the steps of:

extracting circumscribing rectangles of connected components of black pixels of the document image;

sorting the extracted circumscribing rectangles as character candidates and frame candidates according to information including at least one of an aspect ratio, a number of black pixels and, a number of black runs of the extracted circumscribing rectangles;

filling the image inside the entire area of the rectangles which have been sorted as the character candidates with white; and recognizing frames from the rectangles which have been sorted as the frame candidates.

11. A computer readable medium for storing instructions, which when executed on a computer causes the computer to realize a table recognition method of recognizing a frame as a ruled line in a table area of a document image including the table area, the table recognition method comprising the steps of:

extracting circumscribing rectangles of connected components of black pixels of the document image;

sorting the extracted circumscribing rectangles as character candidates and frame candidates according to information including at least one of an aspect ratio, a number of black pixels, and a number of black runs of the extracted circumscribing rectangles;

filling the image inside the entire area of the rectangles which have been sorted as the character candidates with white;

rearranging the rectangles sorted as the frame candidates in order of increasing area;

extracting frames successively from the rectangles sorted as the frame candidates in the order of increasing area; and repeatedly filling the images of the rectangles which have been sorted as the frame candidates from which the frames were extracted with white.

12. A computer readable medium for storing instructions, which when executed on a computer, causes the computer to realize a table recognition method of recognizing a frame as a ruled line in a table area of a document image including the table area, the table recognition method comprising the steps of:

extracting circumscribing rectangles of connected components of black pixels of the document image;

sorting the extracted circumscribing rectangles as character candidates and frame candidates according to information including at least one of an aspect ratio, a number of black pixels, and a number of black runs of the extracted circumscribing rectangles;

filling the image inside the area of the rectangles which have been sorted as the character candidates with white;

rearranging the rectangles sorted as the frame candidates in order of increasing area;

extracting frames successively from the rectangles sorted as the frame candidates in the order of increasing area;

when a number of the rectangles sorted as frame candidates is not more than two and the frame candidates do not establish a positional relationship that the frame candidates are partially overlapped with each other, filling the image inside the area of the rectangles which have been sorted as the character candidates with white; and when the number of the rectangles sorted as frame candidates is not more than two and the frame candidates establish a positional relationship that the frame candidates are partially overlapped with each other, suppressing filling the image inside the area of the rectangles which have been sorted as the character candidates with white and extracting a frame from the rectangle of a next candidate.

* * * * *